May 15, 1956

R. T. BURNETT 2,745,295

TRANSMISSION

Original Filed July 30, 1948

2 Sheets-Sheet 1

INVENTOR.
RICHARD T. BURNETT
BY Cecil J Arens

ATTORNEY

United States Patent Office 2,745,295
Patented May 15, 1956

2,745,295
TRANSMISSION

Richard Thomas Burnett, South Bend, Ind., assignor to Bendix Aviation Corporation, South Bend, Ind., a corporation of Delaware Original application July 30, 1948, Serial No. 41,559. Divided and this application September 8, 1951, Serial No. 246,250

6 Claims. (Cl. 74—677)

This invention relates to transmissions embodying hydro-kinetic torque converters.

This application is a division of my copending application Serial No. 41,559, filed July 30, 1948, now Patent No. 2,598,501.

An important object of the invention is to provide a hydro-kinetic transmission in which the reaction wheel is rotated forward during torque multiplication to thereby obtain rising engine speed with increasing speed ratio when used with an internal combustion engine.

Another important object of the invention resides in the provision of a transmission equipped with a hydro-kinetic torque converter having rotatable bladed turbine and reaction wheels interconnected through a planetary gear train in such a manner that the turbine wheel drives the reaction wheel forward at times of torque multiplication.

A still further important object of the invention resides in the provision of a transmission embodying a hydro-kinetic torque converter interconnected with a single planetary gear train in such a manner as to provide forward and reverse drive.

An object of the invention resides in the provision of a transmission having continuous variable speed and torque without shifts or interruptions or sudden change of input speed.

A yet further object of the invention is to provide a fluid pump for a hydro-kinetic transmission, which pump may be connected either directly to the input shaft to be engine driven, or to the output through a planetary gear train when a vehicle in which the transmission is incorporated is being pushed or towed for starting.

Figure 1:
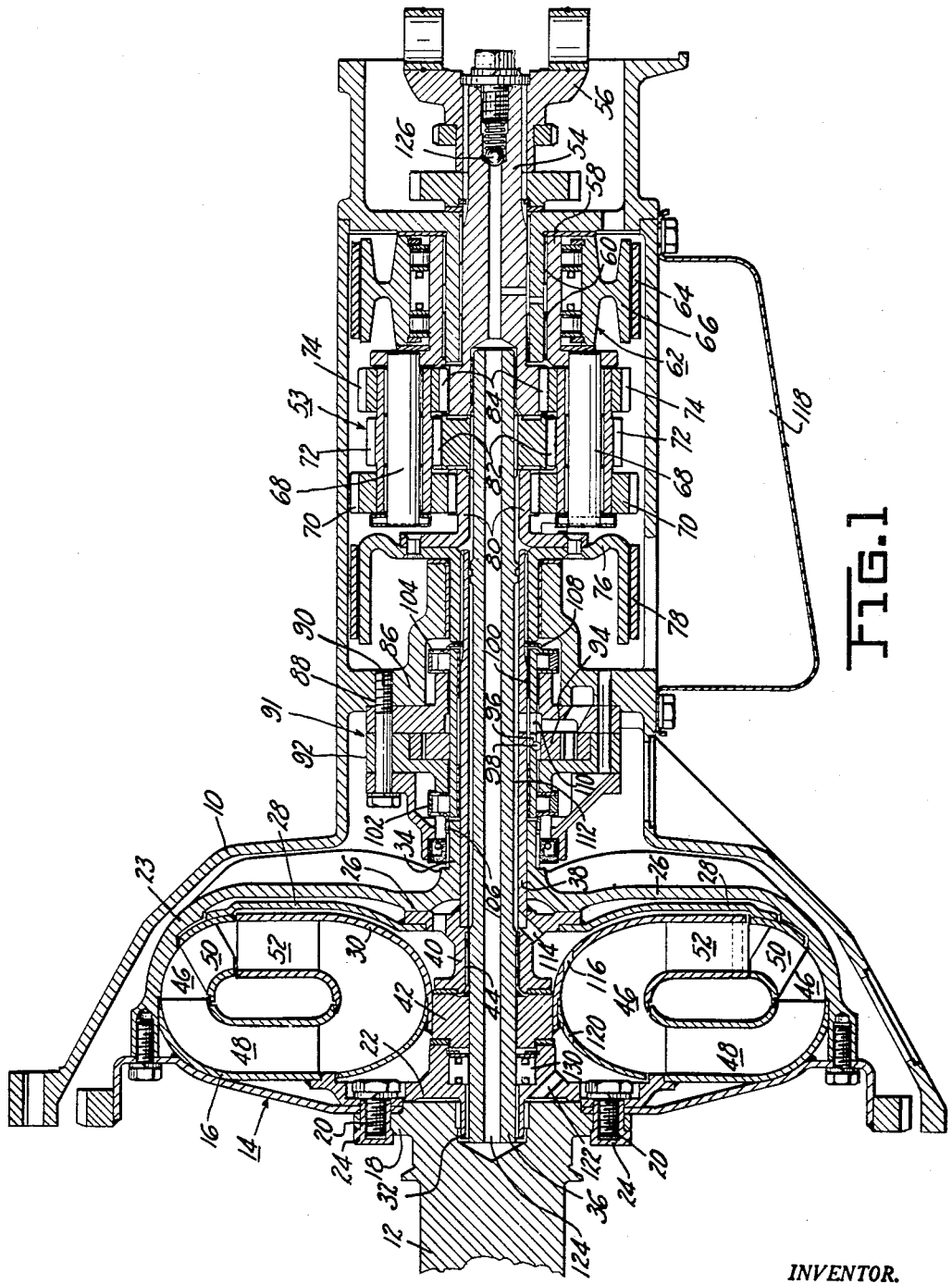
Figure 2:
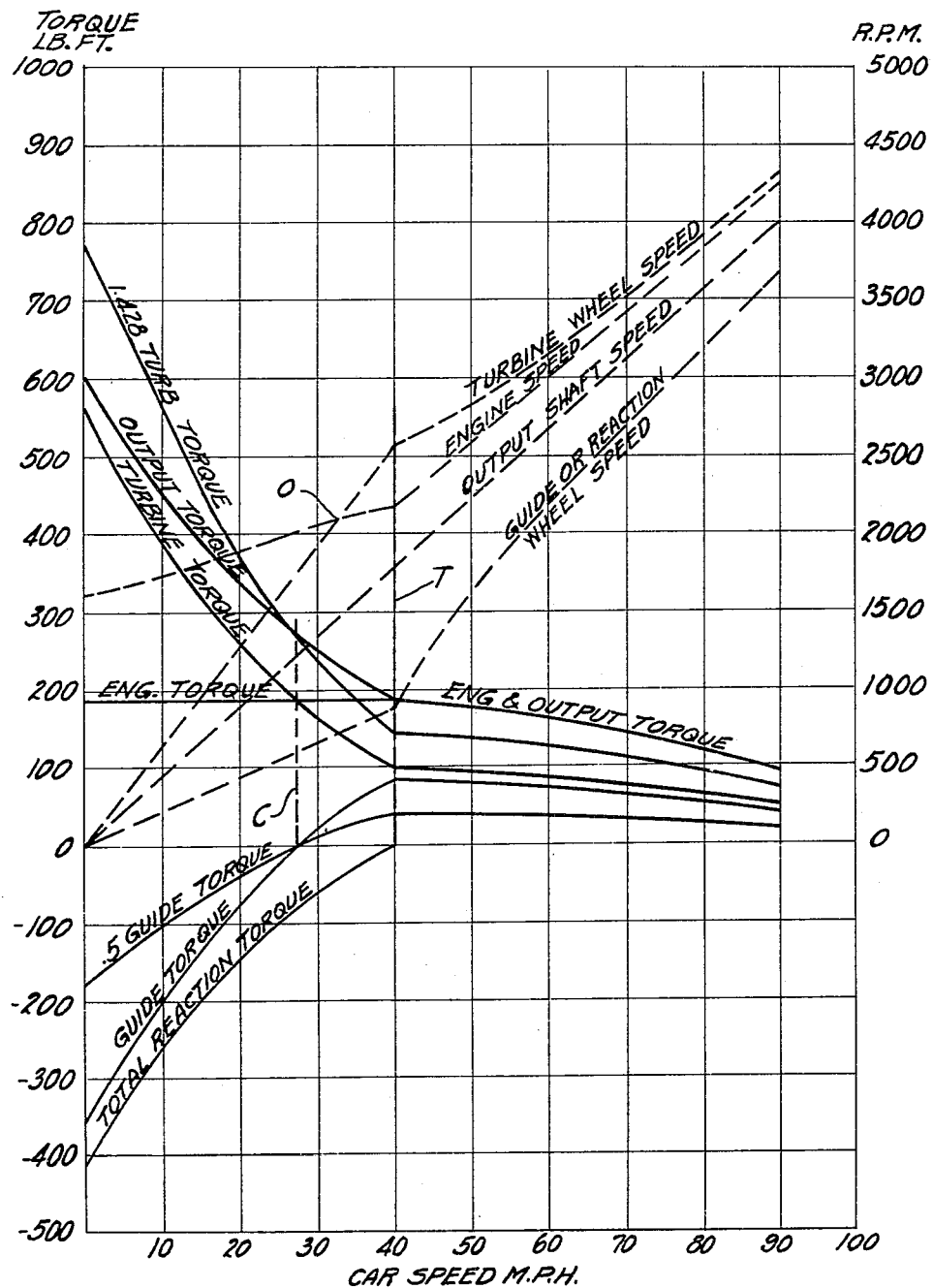

The above and other objects and features of the invention will be apparent from the following description of the apparatus taken in connection with the accompanying drawings which form a part of this specification, and in which:

Figure 1 is a longitudinal sectional view of the transmission of the invention, with parts in elevation; and Figure 2 shows the performance curves of the transmission of Figure 1.

Referring now to Figure 1 for a detailed description of the transmission of my invention, the reference numeral 10 designates a housing which may be suitably secured to an automobile engine, not shown. Energy from the engine is transferred to an input shaft or crankshaft 12, which is drivably connected to a hydro-kinetic torque converter 14.

The torque converter comprises an impeller wheel 16 carried by a flange 18 integral with one end of the input shaft. Bolt studs 20 pass through a support 22 of the impeller wheel and threadedly engage bushings 24, peripherally spaced around the flange. The impeller wheel 16 is further equipped with a second support 26, axially spaced apart from said support 22 and together therewith provides an enclosure or shroud 23 for turbine wheel 28 and reaction wheel 30. The supports 22 and 26 have outturned portions 32 and 34 respectively formed integral therewith to provide hollow stub shaft members. These hollow stub shaft members 32 and 34 rotatably support one end of concentric sleeves or shafts 36 and 38 respectively. The turbine and reaction wheels 28 and 30 are provided with hubs 40 and 42 respectively, which fit over said one end of sleeve 36. The hubs are carried on the sleeve 36 between the hollow stub shaft members 32 and 34. Hub 40, of the turbine wheel, is rotatably supported on a sleeve bearing 44, interposed between the hub and said sleeve 36. Hub 42, of the reaction wheel, is securely fixed to sleeve 36. The impeller, turbine, and reaction wheels are so shaped that together they provide a closed hydraulic circuit or toroidal channel 46, through which fluid is circulated by impeller blades or vanes 48 mounted in a circular row on the impeller wheel. This moving fluid, set in motion by the impeller blades, acts on blades or vanes 50 disposed in a circular row on the turbine wheel, to thereby impart rotation to the turbine wheel. The reaction wheel 30 is equipped with a circular row of blades or vanes 52, which are constituted to take reaction from the moving fluid as well as control the direction of flow of the fluid at the entrance of the impeller wheel, to thereby multiply torque into the turbine wheel. The construction and arrangement of the vanes are such as to produce an overdriving effect on the turbine wheel, as described in my application entitled "Torque Converter," Serial No. 701,595, filed October 5, 1946, now Patent No. 2,634,584. Although the torque converter of the instant application utilizes the same principles for obtaining overdrive as my previously mentioned filed application, the design and arrangement of the impeller and turbine vanes of the herein disclosed converter differ over the earlier filed application.

A torque multiplying planetary gear train 53 is interposed between the torque converter 14 and output shaft 54, to the outer end of which is splined a yoke 56. The gear train comprises a planet carrier 58, revolvably mounted on sleeve bearings 60. A free wheel device 62 is interposed between the planet carrier 58 and a brake band 64 to allow free rotation of said planet carrier in one direction beyond a one-to-one torque ratio of the transmission but to hold said planet carrier from rotation in the other direction during torque multiplication. This, of course, is based on the assumption that the brake band 64 which conditions the transmission for forward drive, is frictionally engaged with external wheel 66 of the free wheel device. With the brake band 64 out of contact with the wheel 66, the planet carrier is free to rotate in either direction. Any suitable means may be employed to operate the brake band 64, such for example, as hydraulic actuation, not shown. Axially extending pins 68 are carried by the planet carrier 58, for rotatably supporting a cluster of planet pinions 70, 72, and 74. These pinions 70, 72, and 74 are integrally related. A drum 76 is splined to one end of the sleeve 38, to the other end of which is fixedly attached the turbine wheel 28. A brake band 78, which connects the transmission for reverse, is arranged for frictional engagement with the drum 76. Any suitable means may be employed for actuating the brake band 78, such, for example, as hydraulic actuation, not shown. Frictional engagement of drum 76, holds the turbine wheel stationary for a purpose to be hereinafter described. A sun gear 80 is carried on the drum 76 for meshing engagement with the pinions 70. The hollow sleeve 36, which carries the reaction wheel 30, is provided with a sun gear 82 arranged for driving engagement with the planet pinions 72. The inner end of driven shaft 54 is equipped with a sun gear 84 which engages the teeth of planet pinion 74.

In the planetary gearing arrangement of Figure 1, the gear ratios are such that with the planet carrier 58 held fixed to accomplish forward drive the torque transmitted to the output shaft 54 from the turbine shaft 38 is approximately 1.5 (one and a half) times the torque impressed on the turbine shaft 38 up to the clutch point of the transmission, at which time input torque equals output torque. During this same period prior to the clutch point of the transmission, that is, prior to one to one torque ratio, the negative torque transmitted to the output shaft 54 from the guide shaft 36 is approximately only .7 (seven tenths) times the torque impressed on the shaft 36.

When in reverse drive the brake band 78 locks sun gear 80, which is integrally related to shaft 38, to the other end of which is fixed the turbine wheel 50. The reaction wheel, which is now free to rotate, is driven in a direction opposite to the impeller wheel to thereby drive sun gear 82 which meshes with the planet pinions 72. Since the planet carrier is now free to rotate, the planet pinions 72 rotate about pins 68 as a moving center, driving the output shaft 54, through gears 74 and 84, with the reaction being taken through gears 70 and 80 into the band 78. In the present illustration the gear ratio of the shaft 36 to the output shaft 54 is in the neighborhood of 1.7 to 1. This ratio obviously provides for a relatively high torque at the output shaft compared to the torque impressed on the shaft 36 at any instant of time. It is to be understood that wherever specific values are used herein it is for purpose of illustration only and the specification is, therefore, not to be limited thereby.

In order to pressurize the fluid for actuating the bands 64 and 78 and to put the fluid in the toroidal channel 46 under pressure a pump 91 is provided. The pump herein used to put the fluid under pressure is believed to embrace certain novel two-way driving features hereinafter described. The housing 10 is formed with an internal radially extending flange 86, drilled and threaded axially at 88 for the reception of screws 90, one only of which is shown. The screws pass through a pump housing 92 and threadedly engage the radial flange. A pump rotor 94 is mounted on a sleeve 96 to be driven thereby through a ball member 98. The sleeve 96 is concentrically positioned with respect to the sleeve 38 and rotates on sleeve bearings 100 interposed between the sleeve 38 and the sleeve 96. The latter sleeve is driven by two one-way clutches 102 and 104 but at different times, depending on which is rotating faster, the turbine or impeller wheel. The one-way clutch 102 is drivably interposed between the hollow stub shaft member 34 and the sleeve 96 so that when the speed ratio of turbine wheel to impeller wheel is less than one to one the pump rotor 94 will be revolved by the impeller to thereby pressurize the hydraulic circuit. Beyond a one to one speed ratio of turbine to impeller wheel the turbine wheel speed will be greater and hence drive the pump rotor. A collar member 106 connects the member 34 to the one-way clutch 102. When the speed ratio of turbine to impeller is less than one to one the one-way clutch 104, which is drivably interposed between the sleeve 96 and the sleeve 38, is overrunning. However, when the speed ratio of turbine to impeller is greater than one to one, as would be the case some time before the clutch point of the transmission was reached, as indicated by the intersection of the curves at O, the turbine wheel, which is integral with sleeve 38, drives the pump rotor 94. At this time, the one-way clutch 102 is overrunning. A collar member 108 drivably connects the sleeve 38 to the one-way clutch 104. Outlet 110 of the pump communicates with the toroidal channel 46 through passages 112, 114, and 116. The toroidal channel 46 communicates with reservoir 118 through passages 120, 122, 124, past valve 126 and thence back to the reservoir via a conduit, not shown. The inlet of the pump, not shown, communicates with the reservoir 118, through an internal passage, not shown. The pump per se forms no part of the present invention but, as aforementioned, the manner of driving the same from two sources is believed novel.

A one-way clutch 130 is interposed between the concentric shaft 36 and the input shaft 12 so that this shaft can be driven by the vehicle at times to thereby drive the engine, not shown, so as to produce a braking or decelerating action on said vehicle. This mechanism is claimed per se in my application Serial No. 5,546, filed January 31, 1948, now Patent No. 2,616,308.

With reference to Figure 2 torque is represented by full line curves and R. P. M. by broken line curves. The reaction in the transmission is represented as a negative torque below the abscissa. The reaction on the guide or reaction wheel will be negative so long as the torque converter multiplies torque. As soon as torque multiplication in the converter has ceased, that is, torque input to the converter equals torque output of the converter, the reaction torque becomes zero as indicated by the intersection of the abscissa and the reaction torque curves. This is commonly termed the "clutch point" of the converter and is that point at which the fluid enters the guide or reaction wheel at such an angle that no change in angular momentum of the fluid takes place. A vertical line C has been drawn through this point for ready reference to the condition of the elements of the transmission. Although the reaction torque of the reaction wheel has become zero, as aforementioned, the total reaction torque of the transmission is still negative due to torque multiplication in the planetary gear train 52, as best shown in Figure 2 where the total reaction torque is below the abscissa. When torque multiplication of the transmission ceases, that is, input and output torque become equal, the total reaction torque becomes zero, as indicated by the intersection of the "total reaction torque" curve with the abscissa. This point of intersection of the "total reaction torque" curve with the abscissa is defined as the "clutch point" of the transmission and a vertical line T is drawn therethrough for ready reference to the condition of other elements of the transmission at this point.

With the output shaft speed curve as a reference it will be noted that the reaction wheel speed increases at a slower rate and the turbine wheel speed increases at a greater rate up to the clutch point of the transmission beyond which the curves representing the reaction and turbine wheel speeds converge on the curve representing the output shaft speed.

From a stall condition with the engine idling at about 1600 R. P. M. the engine speed curve rises to 2,150 R. P. M. at the clutch point T, of the transmission, during which time engine torque has remained substantially constant as shown by the engine torque curve. The output shaft and engine speed curves tend to converge at the clutch point. Beyond the clutch point T, that is, during the coupling range, engine speed continues to be greater than output shaft speed with a relatively small percentage of slip between them.

Between stall and the clutch point C of the converter the output torque at any instant is equal to the toal turbine torque in the planetary gear train, which is represented by curve "1.428 turbine torque," minus .5 guide torque. Beyond the clutch point C of the converter the guide wheel torque becomes positive and is added to the turbine torque. At the clutch point T of the transmission engine torque equals output torque as shown by the intersection of the output and engine torque curves. This occurs at a vehicle speed of approximately 40 miles per hour.

Operation and function of the transmission:

Referring now to Figure 1, with the crankshaft 12 rotating and brake bands 64 and 78 released, there can be no torque reaction and consequently no torque multiplication. If the forward brake band 64 is now caused to frictionally engage the external wheel 66 a negative torque reaction is taken thereby through the planet carrier 58, thence through the free wheel device 62. Shortly after the brake band has locked the transmission into forward drive, torque will be impressed on the output shaft 54, which will begin to rotate when the torque reaches a value sufficient to overcome the load on the output shaft. The torque impressed on the input shaft is first multiplied in the torque converter, thence transmitted through the sleeve 38, to which sun gear 80 is drivably connected, and into the planetary gear train 53, where the torque is again multiplied before being transferred to the output shaft. During the period of torque multiplication in the transmission, that is, so long as torque output exceeds torque input, the reaction will be in a direction through said free wheel device 62 to lock the same against rotation. During this period the reaction wheel is driven forward in the same direction as the impeller and turbine wheels but at a rate less than turbine wheel speed. That is the reaction wheel is driven forward at a fixed ratio with respect to the turbine wheel. As hereinbefore explained this is accomplished by interposing the planetary gear train between the turbine and reaction wheels. Beyond a torque ratio of unity, that is, the clutch point of the transmission, at which time torque reaction in the transmission has ceased, the planet carrier 58 will be free to rotate in a direction opposite to that in which reaction was tending to rotate said planet carrier. At this time the torque converter is performing as a hydraulic coupling. As is obvious from an examination of the curves of Figure 2, beyond the "clutch point" of the transmission the turbine wheel speed rises at a slower rate, the engine speed rises at a greater rate, and the reaction wheel speed also rises at an increased rate. This trend will continue with the input shaft speed approaching the output shaft speed as the car speed is increased.

Assume a condition in the transmission wherein the forward brake band 64 is released and the reverse brake band 78 is caused to frictionally engage the drum 76, to thereby lock the sun gear 80 against rotation. With this arrangement the turbine wheel 50 is held against rotation, since it is carried by the sleeve 38 onto which the locked sun gear 80 is splined. The reaction wheel will be revolved in a direction opposite to the impeller wheel, under the influence of the circulating fluid to thereby drive the concentric shaft 36. The sun gear 82 is securely fixed to the other end of the shaft 36 for driving engagement with the planet pinion 72. This drives the output shaft in a reverse direction and at a reduced speed.

Although this invention has been described in connection with certain specific embodiments, the principles are susceptible of numerous other applications that will readily occur to persons skilled in the art.

Having thus described the various features of the invention, what I claim as new and desire to secure by Letters Patent is:

1. A transmission comprising a hydro-kinetic torque converter having rotatable bladed turbine and reaction wheels, said reaction wheel tending to rotate in a direction opposite to that of said turbine wheel, a planetary gear train including a planet carrier mounting pinions, a first sun gear arranged in meshing relationship to one of said pinions and being securely fixed to said turbine wheel, a second sun gear arranged in meshing relationship to another of said pinions and being securely fixed to said reaction wheel, a third sun gear arranged in meshing relationship to still another of said pinions, an output shaft connected to said third sun gear, and means for holding said planet carrier or said first sun gear to thereby connect the output shaft for forward or reverse rotation respectively.

2. A transmission comprising input and output shafts, a hydro-kinetic torque converter having rotatable bladed impeller, turbine, and reaction wheels, said reaction wheel tending to rotate in a direction opposite to that of said impeller wheel, said impeller wheel being connected to said input shaft, a planetary gear train including a planet carrier mounting pinions, a first sun gear arranged in meshing relationship to one of said pinions and being securely fixed to said turbine wheel, a second sun gear arranged in meshing relationship to another of said pinions and being securely fixed to said reaction wheel, a third sun gear arranged in meshing relationship to still another of said pinions and drivably connected to said output shaft, and means for holding said planet carrier or said first sun gear to thereby connect the output shaft for forward or reverse rotation respectively.

3. A transmission including a hydraulic torque converter provided with rotatable bladed impeller, turbine, and reaction wheels, a power input member connected to said impeller wheel, a planet carrier on which is mounted a triple planet pinion, a first gear arranged in meshing relationship to one of said pinions and being securely fixed to said turbine wheel, a second gear arranged in meshing relationship to another of said pinions and being securely fixed to said reaction wheel, an output shaft, a third gear arranged in meshing relationship to the remaining pinion and having a connection to said output shaft, and means for holding said planet carrier.

4. A transmission comprising a hydraulic torque converter provided with rotatable bladed impeller, turbine, and reaction wheels, a power input member connected to said impeller wheel, a planet carrier on which is mounted a triple planet pinion, a first gear arranged in meshing relationship to one of said pinions and being securely fixed to said turbine wheel, a second gear arranged in meshing relationship to another of said pinions and being securely fixed to said reaction wheel, an output shaft, a third gear arranged in meshing relationship to still another pinion and having a connection to said output shaft, and means for holding said first gear and said turbine wheel to establish the output shaft in reverse drive.

5. A transmission comprising a hydraulic torque converter provided with rotatable bladed impeller, turbine, and reaction wheels, an input shaft to which said impeller wheel is drivably connected, a planet carrier on which is mounted a triple planet pinion, three gears in meshing relationship with said triple planet pinion, an output shaft connected to one of said gears, coaxial shafts connected to the other of said gears and being securely fixed to said turbine and reaction wheels, said triple planet pinion being of different pitch diameters and so related to the respective gears that at times forward torque from the turbine wheel is split up in the triple planet pinion in such a manner as to rotate the output shaft and drive the reaction wheel forward at a fixed ratio, and means for taking reaction from the planet carrier.

6. A transmission comprising a hydraulic torque converter equipped with rotatable bladed impeller, turbine, and reaction wheels, an input shaft to which said impeller is drivably connected, an output shaft, a planetary gear train including a planet carrier on which a triple planet pinion is mounted, a gear meshing with each pinion, a power transferring element integrally connecting respective gears to the turbine wheel, reaction wheel, and output shaft respectively, the ratios between the triple planet pinion and the gears being such that after torque unity in the converter, forward torque from the converter is divided in a fixed ratio between the reaction and turbine wheels, and means for holding the planet carrier against rotation.

References Cited in the file of this patent
UNITED STATES PATENTS

| | | |
|---|---|---|
| 2,136,419 | Duffield | Nov. 15, 1938 |
| 2,206,859 | Duffield | July 2, 1940 |
| 2,306,834 | Tipton | Dec. 29, 1942 |
| 2,343,955 | Cotterman | Mar. 14, 1944 |
| 2,346,365 | Duffield | Apr. 11, 1944 |
| 2,363,983 | Miller | Nov. 28, 1944 |
| 2,379,174 | Miller | June 26, 1945 |
| 2,456,328 | Schneider | Dec. 14, 1948 |
| 2,498,797 | Duffield | Feb. 28, 1950 |
| 2,577,413 | Frailing | Dec. 4, 1951 |
| 2,584,965 | McFarland | Feb. 5, 1952 |